UNITED STATES PATENT OFFICE.

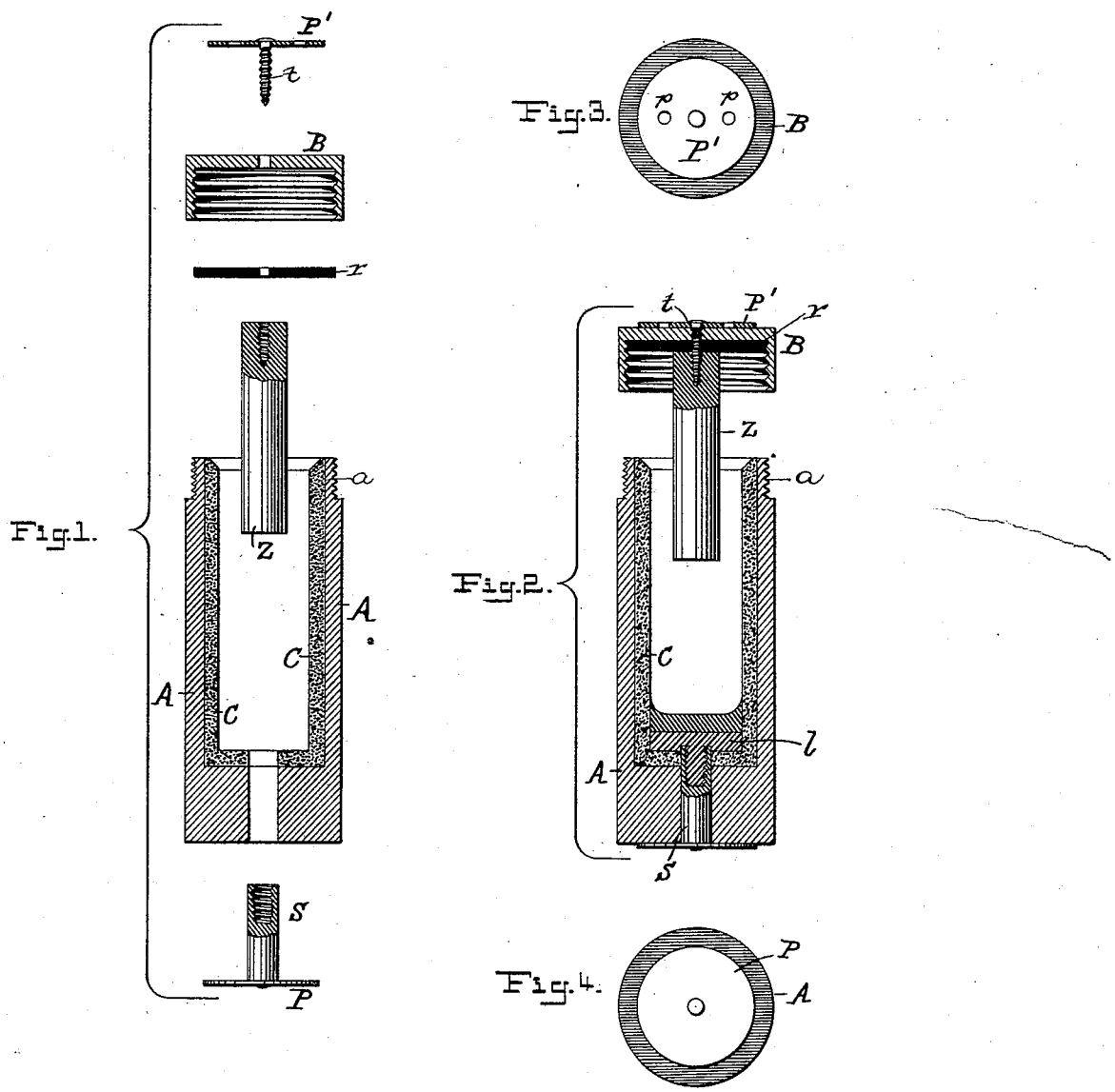

JOHN ELLWOOD LEE, OF CONSHOHOCKEN, PENNSYLVANIA, ASSIGNOR TO THE J. ELLWOOD LEE COMPANY, OF SAME PLACE.

GALVANIC BATTERY.

SPECIFICATION forming part of Letters Patent No. 406,223, dated July 2, 1889.

Application filed March 14, 1889. Serial No. 303,201. (No model.)

*To all whom it may concern:*

Be it known that I, JOHN ELLWOOD LEE, a citizen of the United States, and a resident of Conshohocken, Montgomery county, Pennsylvania, have invented an Improved Battery-Cell, of which the following is a specification.

My invention consists of certain improvements in the construction of electrical battery-cells, more especially for portable batteries for medical use.

In the accompanying drawings, Figure 1 is a vertical section of my improved battery with the several separate parts before being put together. Fig. 2 is a corresponding section with the parts put together or assembled ready for use, but showing the cap of the cell with its parts before it is screwed down onto the body; and Figs. 3 and 4 are views of the opposite ends of the battery.

The body A of the battery may be made of hard rubber or other suitable insulating material, and preferably of the cylindrical form shown. At its open end it is threaded at *a* for the reception of a correspondingly-threaded cap B, also of hard rubber or other suitable insulating material. I prefer in constructing the battery to attach one of the elements to the body A of the cell and the other to the removable cap B, and to electrically connect them with suitable flat contact-plates P P' on the outside. These contact-plates are, in the present instance, on the ends of the cylinder, which is closed by the screwing on of the cap B. In the present instance I have shown one element or electrode as in the form of a zinc rod Z, carried by the cap, while the other is in the form of a carbon cup C within and carried by the body A of the cell.

The contact-plate P has a stem *s*, which is passed through an opening in the end or bottom of the cell and the carbon cup C, and this stem has grooves formed in its upper end. For convenience of manufacture these grooves are in the form of a screw-thread tapped into the end of the stem. This stem *s* of the contact-plate P is then passed through the opening in the end of the cup, and molten lead or zinc or other metallic body is poured into the bottom of the cup, as shown at *l* in Fig. 2, to mechanically secure the plate with its stem in place and electrically connect the plate with the carbon cup C. A protecting layer of shellac or similar material is then poured over this zinc or lead to prevent the liquid from eating it away.

The zinc rod is secured to the cap by means of a screw *t*, which is fastened to or forms part of the contact-plate P', and this latter is provided with holes *p*, Fig. 3, for the application of a forked instrument to tighten the screw up or to loosen it when the zinc is to be replaced. A rubber disk *r* is placed in the cap, and is held between the end of the rod and the cap to make a tight joint there, and also for the purpose of making a tight joint around the rim of the cell when the cap is screwed down.

I claim as my invention—

1. The combination of the battery-cell having a cup electrode with a contact-plate having a grooved stem passing through the body of the cell and into the cup, and the metallic body mechanically securing the said stem and electrically connecting it to the cup, all substantially as described.

2. The combination of the battery-cell having a cup electrode with an outside contact-plate having a grooved stem passing through the body of the cell and into the cup, the metallic body mechanically securing the said stem and electrically connecting it to the cup, and a protecting layer of shellac or similar material over said metallic body, substantially as described.

3. The combination of the body of the cell and the screw-cap having a contact-plate on the outside and a screw-stem passing through it with a rod electrode and a rubber disk held between the end of the rod and the cap, and also serving as a gasket for the rim of the cell, all substantially as described.

In testimony whereof I have signed my name to this specification in the presence of two subscribing witnesses.

JOHN ELLWOOD LEE.

Witnesses:
  C. A. RAMSEY,
  PHILIP METZGAR.